(No Model.)

F. & C. BUEHRIG.
EGG TESTER.

No. 430,334. Patented June 17, 1890.

WITNESSES:
John N. Deemer
C. Sedgwick

INVENTOR:
F. Buehrig
C. Buehrig
BY Munn & Co.
ATTORNEYS.

UNITED STATES PATENT OFFICE.

FREDERICK BUEHRIG AND CHARLES BUEHRIG, OF MINIER, ILLINOIS.

EGG-TESTER.

SPECIFICATION forming part of Letters Patent No. 430,334, dated June 17, 1890.

Application filed September 18, 1889. Serial No. 324,287. (No model.)

*To all whom it may concern:*

Be it known that we, FREDERICK BUEHRIG and CHARLES BUEHRIG, of Minier, in the county of Tazewell and State of Illinois, have invented a new and Improved Egg Tester and Register, of which the following is a full, clear, and exact description.

Our invention relates to an apparatus for testing the freshness of eggs, and has for its object to provide a simple, inexpensive, and efficient device of this character, allowing eggs to be tested more quickly, conveniently, and thoroughly than by handling them singly in the ordinary manner. The apparatus is also provided with a tally device which automatically registers the number of eggs tested and stops the testing operation when the registry ceases.

The invention consists in certain novel features of construction and combination of parts of the egg tester and register, all as hereinafter described and claimed.

Reference is to be had to the accompanying drawings, forming a part of this specification, in which similar letters of reference indicate corresponding parts in all the figures.

Figure 1:
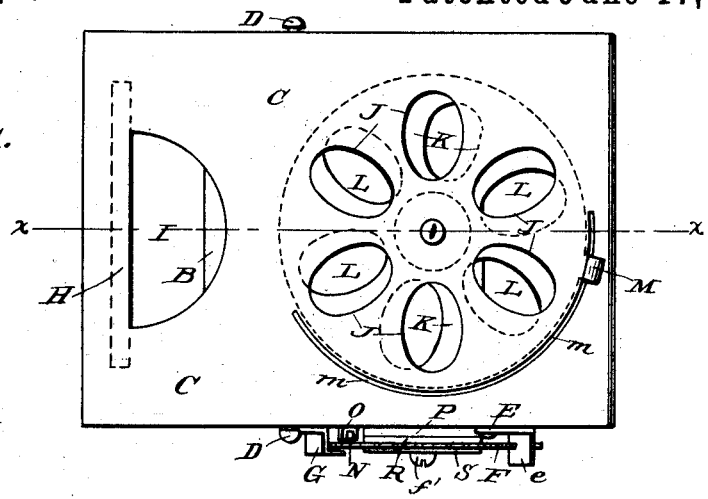
Figure 2:
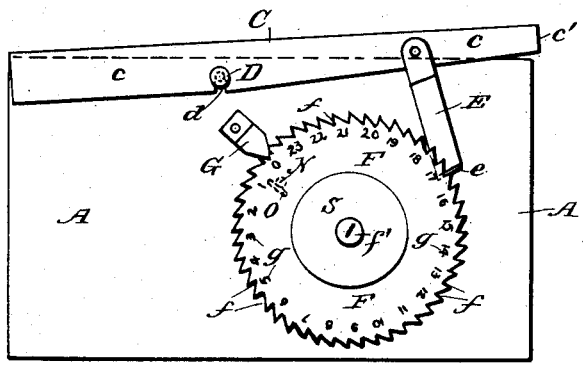
Figure 3:
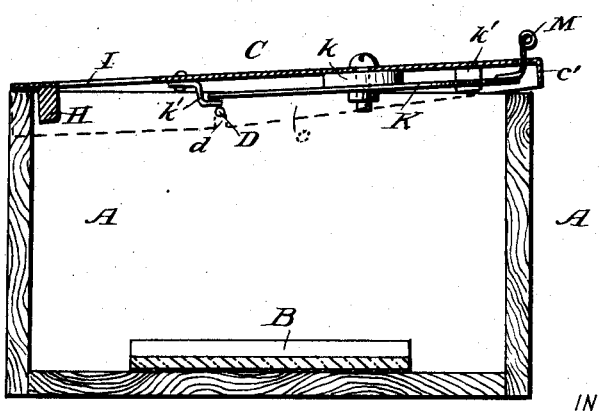

Figure 1 is a plan view of our egg tester and register. Fig. 2 is a side view thereof, and Fig. 3 is a longitudinal vertical section of the device taken on the line $x$ $x$ in Fig. 1.

The egg tester and register device is made with a box A, of suitable size and material, provided with a mirror or reflector B at the bottom on the inside. The inner faces of the walls of the box are blackened to give better reflection of the mirror. The top or lid C of the box is preferably made of metal and with downbent side flanges $c$, provided with open-ended slots $d$, which receive pins D D, fixed one in each side of the box, and whereby the lid is fulcrumed on the pins in a manner causing a pendent pawl E, hung on it, to operate a tally-wheel F, journaled to the side wall of the box, and which, by an index-finger or plate G fixed to the box, will register the number of eggs tested, as hereinafter more fully explained. The fulcruming of the box-lid C by the open slots $d$ and pins D also allows the entire lid with its attachments to be quickly and conveniently removed or lifted from the box to allow inspection or cleaning of its interior. The lid is stiffened transversely by a front pendent flange $c'$ and by a rear cleat H. This cleat is preferably made of metal and acts as a counterpoise to hold the rear end of the lid down to the box A, and is located at the rear edge of the sight hole or opening I made through the rear portion of the lid.

At its front part the box-lid C is provided with a series of elliptical holes or openings J, preferably six, and into which the eggs to be tested are placed and supported, so that they will be reflected in the mirror B to a person looking through the sight-hole of the lid. Below these openings J a plate K is pivoted to the under side of the lid C and is provided with a series of holes or openings L, corresponding in arrangement, and it may be also in size, with the series of openings J. This plate K is sustained by a suitable boss or washer $k$, placed between it and the lid C at proper distance below the lid—say one-quarter of an inch, more or less—to cause the eggs laid in the lid-openings J and also entering the plate-openings L to be turned when the plate is turned, and to provide for conveniently turning the plate we have fixed to it a suitable handle-piece M, which projects up through a curved slot $m$ in the lid. Should the plate K be made of sheet metal or other thin material, it may be supported at its margin by a series of underlapping clips $k'$, fixed to the under side of the lid; but if it be made of wood or other stiff substance these clips may be dispensed with.

The tally wheel or dial F is provided with peripheral teeth $f$, which are engaged by the notched outbent free end $e$ of the pawl E, hung on the lid, and the outer pointed end of the index finger or plate G is directed to a scale $g$ of numbers ranging around the face of the tally-wheel, these numbers being spaced apart the distance of two teeth of the wheel, so that with six egg-holding openings in the lid each time the lid is depressed at its front end the tally-wheel will be turned the space of one tooth to indicate the testing of one half-dozen eggs, and two depressions of the lid will register one dozen eggs, and the successive dozens will be read off by the successively higher numbers on the tally-wheel.

The tally-wheel at its inside face has a stop-pin N, which is adapted to strike either side or face of a stud O fixed to the side of the mirror-box A. When the wheel-pin stands against the front of the box-stud, as indicated in dotted lines in Fig. 2 of the drawings, the index G will point to zero on the scale of the tally-wheel, and when the full count of the wheel has been compassed as it completes a revolution its pin N will strike the rear face of the box-stud O to prevent tilting of the lid by the pawl E; hence before the egg testing and registering operations can proceed the pawl must be lifted from the wheel and the wheel must be turned back until its pin N again strikes the front of the box-stud O to bring the zero of the wheel-scale again to the index-pointer G on the box, ready to begin another count or register of the tested eggs.

To prevent slipping or turning of the tally-wheel F on its supporting screw or journal $f'$, except as it is rotated by the pawl E, we fix to the outer face of the box A a piece P of felt, cloth, rubber, or some other suitable fabric, and fix a like fabric R to the inner face of the tally-wheel, so that when the screw $f'$ is turned into the box A through the wheel and the fabrics R P the friction of these fabrics one on the other will prevent accidental turning of the wheel but allow its operation by the pawl; but one piece of friction fabric having proper thickness may be employed. We prefer to place a metal washer-plate S, of about the same diameter as the friction fabric or fabrics, outside of the tally-wheel and under the head of the screw-journal of the wheel.

The continuous operation of our egg tester and register device is very simple and effective, as follows:

When a half-dozen eggs are placed in the coinciding holes or openings J L of the box-lid C and plate K, respectively, the operator will, by looking through the sight-hole I of the lid, see the eggs reflected in the mirror B, and as the operator grasps the handle M and moves it backward and forward around in the lid-slot $m$ the plate K will be turned and will simultaneously turn all the eggs on the lid around as often as desired to reflect every side of them in the mirror to thoroughly test their freshness by daylight alone, or at night by the aid of a candle or light placed in a proper position. It requires but a few moments to test all the eggs on the lid. As the lid was depressed by the eggs placed on it, the front end of the lid was pressed down and operated the tally-wheel F by the pawl E, and registered by the pointer G, the eggs tested, and these will then be removed from the lid and turning-plate holes or openings J L, and another lot of eggs will be placed therein to be tested and registered on the tally-wheel in the manner above described. The lid may be provided with any desired number of egg-receiving holes, which will be duplicated in the turning-plate.

While the rotary form of the egg-turning device is preferred, it is obvious that the box-lid may have straight rows of egg-receiving holes and that the egg-turning plate may be arranged for reciprocation across or lengthwise of the box within the scope of our invention.

Having thus described our invention, what we claim as new, and desire to secure by Letters Patent, is—

1. In an egg-tester, the combination, with a box having a cover provided with a series of openings constructed to receive the eggs sidewise, of a movable egg-turner having openings corresponding in number with the cover-openings, and a sight-opening leading into the box, through which all of the eggs may be viewed at once as they are simultaneously turned, substantially as set forth.

2. In an egg-tester, the combination, with a box having a cover provided with a circular series of openings adapted to receive the eggs sidewise, of an egg-turner pivoted to the cover parallel therewith and having a series of openings, and a sight-opening, through which all of the eggs may be viewed at once as they are simultaneously turned, substantially as set forth.

3. The combination, in an egg-testing device, of a box, a mirror therein, a lid on the box having a sight-hole and a circularly-arranged series of egg-receiving openings, and a rotating plate having openings adapted to coincide with the lid egg-openings and turning the eggs to present all sides of them to the mirror, substantially as herein set forth.

4. The combination, in an egg-testing device, of a box, a mirror therein, a lid on the box having egg-holes J and a curved slot $m$, and an egg-turning plate K, journaled under the lid and having egg-holes L and a handle M, projecting upward through the lid-slot $m$, substantially as herein set forth.

5. An egg testing and registering device, comprising a box, a mirror therein, a tilting cover for the box provided with a sight-opening and egg-receiving holes, an egg-turning device carried by the cover, and a registering device operated by the cover, substantially as described.

6. In an egg testing and registering device, comprising a box, a mirror in the box, a tilting cover for the box provided with a sight-opening and egg-receiving holes, an egg-turner carried by the cover, a registering device, and a pawl pivoted to the cover and serving to operate the registering device, substantially as herein shown and described.

7. In an egg testing and registering device, the combination, with a box having the fulcrum-pins, of a bodily-removable cover provided with open slots $d$, adapted to receive the said pins, and with egg-receiving holes, a registering device, and a pawl pivoted to the cover and adapted to engage and operate the registering device, substantially as herein shown and described.

FREDERICK BUEHRIG.
CHARLES BUEHRIG.

Witnesses:
CHRISTOPH WILLEMS,
FRIEDRICH MUNDER.